Sept. 29, 1925.
C. H. BEDELL
COMPASS
Filed Aug. 3, 1923
1,555,794
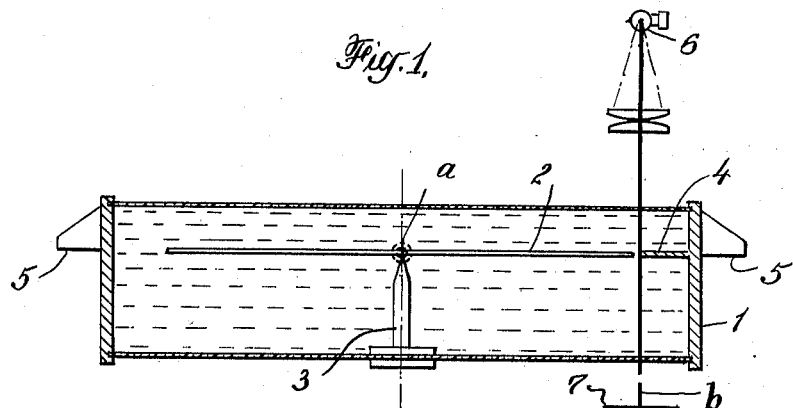
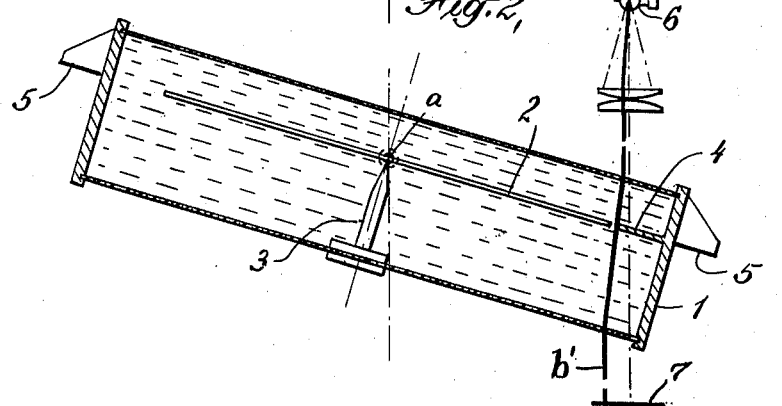
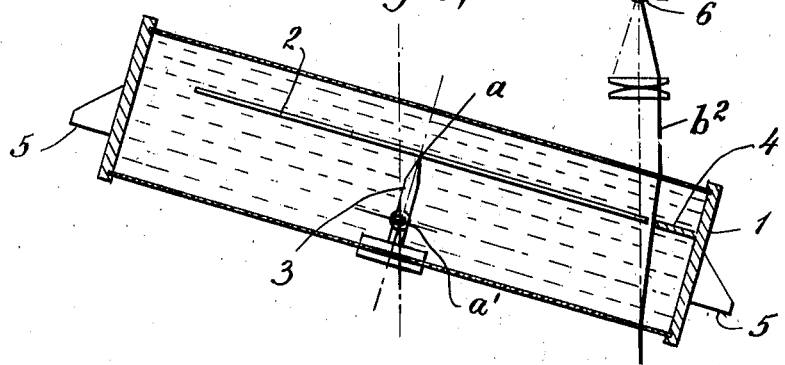
Charles H. Bedell
INVENTOR
Pennie, Davis, Marvin & Edmonds
his ATTORNEYS Patented Sept. 29, 1925.

1,555,794

UNITED STATES PATENT OFFICE.

CHARLES H. BEDELL, OF NEW LONDON, CONNECTICUT, ASSIGNOR TO ELECTRIC BOAT COMPANY, A CORPORATION OF NEW JERSEY.

COMPASS.

Application filed August 3, 1923. Serial No. 655,447.

*To all whom it may concern:*

Be it known that I, CHARLES H. BEDELL, a citizen of the United States, residing at New London, in the county of New London, State of Connecticut, have invented certain new and useful Improvements in Compasses; and I do hereby declare the following to be a full, clear, and exact description of the invention, such as will enable others skilled in the art to which it appertains to make and use the same.

This invention relates to a compass system for ships wherein an image of the compass card is projected to some distant point. More particularly, it relates to the mounting of a liquid compass for use in such a system.

In my copending application, Serial No. 557,029, filed April 27, 1922, now Patent No. 1,520,002 I have shown and described a compass system for ships, in which the image of a transparent compass card mounted within a compass bowl in a binnacle on deck, is projected upon a screen or ground glass in the interior of the vessel by means of a lamp and a series of lenses. This system works very well as illustrated, except where the compass is a liquid compass. The standard method of building compasses is to place the card, pivot, lubber line point and knife-edges or other support, all in line. When the ship is on an even keel, the beam of light which passes by the lubber line point and adjacent parts of the card is along the center line of the lamp and condensing lenses, but when the ship is rolling and a liquid compass is used in the system, the light is bent, due to refraction as it passes through the liquid, and the beam that projects the image of the lubber line point and adjacent parts of the card is no longer that of the center line, thus causing the image to shift on the ground glass.

It is the object of the present invention to overcome this disadvantage, and so construct a liquid compass that it may be used in a projecting system aboard a rolling ship without a shifting of the projected image either on the ground glass or in the field of vision of an observer where a screen is not used. I have attained this object by shifting the compass card bodily as the ship rolls and pitches, so that the light passing through any given point on the card is automatically brought back into its original alignment when it emerges from the compass. To effect this automatic shift of the card, I have placed the knife-edges or supports, upon which the compass is mounted for universal movement, below the plane of the card, so that when the ship rolls the card is swung outwardly an amount sufficient to compensate for the displacement of the light due to its refraction in passing through the liquid of the compass.

In order that the invention may be more clearly understood, I have illustrated in the accompanying drawings, the manner in which I mount the liquid compass so that the refracted light is caused to emerge from the compass in the same line no matter what the angular relation between the compass and the projecting light may be. These drawings are merely diagrammatic, no attempt being made to illustrate any of the details of the compass or the system. Fig. 1 illustrates the position of a liquid compass used in a projecting system, the knife-edges being in the plane of the compass card; the relation of the parts being that which obtains when the ship is on an even keel. Fig. 2 represents the relation of the parts when the ship is rocking. As shown, the compass is inclined at an angle to the vertical. This is done for convenience, it being understood, of course, that the compass remains horizontal while the ship rolls. Fig. 3 represents a liquid compass mounted in accordance with the present invention, but displaced from the normal at the same angle as that shown in Fig. 2.

In these drawings, 1 represents the compass box or bowl provided with transparent top and bottom plates, and filled with the usual liquid. Within this bowl is a transparent compass card 2, mounted at the point *a* upon a pivot 3, and is designed to rotate relative to a fixed lubber line point 4, which extends inwardly from the inner face of the bowl. The bowl is mounted for universal movement upon the usual knife-edges 5 situated in the plane of the card. A projecting lamp 6 is mounted above the bowl and the light therefrom passes through a pair of condensing lenses, through the compass and card, and through a series of lenses, not shown, to a screen 7 or eye-piece situated in some distant part of the ship. As illustrated, the beam $b$ of light coincident with the axis of the optical system passes by the tip of the lubber line point, so that the projection of this point normally lies in the center of the ground glass or field of vision below.

When the ship rolls and pitches, the compass takes the relative position shown in Fig. 2, and as the knife-edges are in the plane of the card, the entire compass is pivoted about the point $a$. It will now be observed that the beam of light passing by the tip of the lubber line point is no longer coincident with the axis of the optical system, but being refracted, is bent to one side, so that on the ground glass the image of the lubber line point is displaced a distance equal to the distance between this retracted beam $b'$ and the axis. This displacement is equally true of all other points within the light field, so that it is obvious that as the ship rocks the projected image is continuously moving.

The compass represented in Fig. 3, is provided with knife-edges, which are situated some distance below the plane of the card, so that as the angle between the compass and the ship changes, the compass does not pivot about the point $a$, but about the point $a'$, situated below the point $a$ a distance equal to that between the knife-edges and the plane of the card. Thus the whole compass is shifted bodily to one side, and the beam $b^2$ of light passing by the tip of the lubber line point, although refracted the same amount as the beam $b'$ illustrated in Fig. 2, nevertheless emerges from the compass as coincident with the axis of the optical system, and hence there is no displacement of the projected image.

Knowing the dimensions of the compass and the refractive index of the liquid, it is a simple matter to determine in any given instance in what plane to mount the knife-edges. Working with a compass 8⅜ inches in diameter (6⅛ inches card diameter), 3 1/16 inches thick, and filled with alcohol and water, I have determined that the knife-edges should be situated 9/16 inch below the plane of the card.

In the drawing accompanying this application, the compass is shown as tipping in one plane only. It is, of course, obvious that in actual practice the movement is not so simple but is the resultant of both the rolling and pitching of the ship. It nevertheless remains true that for any angular position of the compass, within the limits of practical use, light passing through a given point on the card emerges in substantially the same straight line provided the plane of support is placed the proper distance below the plane of the card.

I claim:

1. In a system for projecting the image of a ship's compass card to a distant point by means of light transmitted through the card, the combination of a source of light, a liquid compass, a transparent card therein, and means for shifting the card as the movement of the ship rocks the compass relative to the projecting light to compensate for the refraction of the projecting light, and thus lessen or prevent shifting of the projected image.

2. In a system for projecting the image of a ship's compass card to a distant point by means of light transmitted through the card, the combination of a source of light, a liquid compass, a transparent card therein, and means situated below the plane of the card supporting the compass for universal movement, the arrangement being such that as the movement of the ship rocks the compass relative to the projecting light, the card is shifted to compensate for the refraction of the projecting light by the liquid of the compass.

3. A compass system for ships comprising the combination of a series of lenses, a source of light in alignment therewith, a liquid compass having a transparent top and bottom and a transparent card interposed within the path of the light through the lenses, a screen upon which an image of the card is projected, and means for shifting the compass and its card as the ship rolls to prevent shifting of the image on the screen due to the refraction of the light passing through the liquid of the compass.

4. A compass system for ships comprising the combination of a series of lenses, a source of light in alignment therewith, a liquid compass having a transparent top and bottom and a transparent card interposed within the path of the light through the lenses, a screen upon which an image of the card is projected, and knife-edge supports for the compass situated below the plane of the card for shifting the compass and its card as the ship rolls to prevent shifting of the image on the screen, due to the refraction of the light passing through the liquid of the compass.

5. In a projecting compass system for ships in which an image of a transparent compass card is projected to a point remote from the compass by means of a light passing through the compass, the combination of a source of light, a liquid compass, and means for shifting the compass as the ship rocks, so that the light passing through any given point on the card always emerges from the compass in the same straight line.

6. In a projecting compass system for ships in which an image of a transparent compass card and its lubber line point are projected to a point remote from the compass by means of a light passing through the compass, the combination of a source of light, a liquid compass, and means for shifting the compass as the ship rocks, so that the light passing by the tip of the lubber line point always emerges from the compass in the same straight line, this line being the center line of the light field.

In testimony whereof I affix my signature.

CHARLES H. BEDELL.